United States Patent
Mao et al.

(10) Patent No.: US 11,087,785 B1
(45) Date of Patent: Aug. 10, 2021

(54) EFFECTIVE REAR HARD BIAS FOR DUAL FREE LAYER READ HEADS

(71) Applicant: Western Digital Technologies, Inc., San Jose, CA (US)

(72) Inventors: Ming Mao, Dublin, CA (US); Daniele Mauri, San Jose, CA (US); Chen-Jung Chien, Mountain View, CA (US); Guanxiong Li, Fremont, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 16/915,718

(22) Filed: Jun. 29, 2020

(51) Int. Cl.
| | |
|---|---|
| *G11B 5/39* | (2006.01) |
| *G11B 5/858* | (2006.01) |
| *G11B 5/48* | (2006.01) |
| *G11B 5/60* | (2006.01) |
| *G11B 5/851* | (2006.01) |

(52) U.S. Cl.
CPC .......... *G11B 5/3932* (2013.01); *G11B 5/3906* (2013.01); *G11B 5/399* (2013.01); *G11B 5/3909* (2013.01); *G11B 5/3912* (2013.01); *G11B 5/4826* (2013.01); *G11B 5/6064* (2013.01); *G11B 5/851* (2013.01); *G11B 5/858* (2013.01)

(58) Field of Classification Search
None
See application file for complete search history.

(56) References Cited

U.S. PATENT DOCUMENTS

| | | | |
|---|---|---|---|
| 7,688,555 B2 | 3/2010 | Zhang et al. | |
| 8,570,690 B2 | 10/2013 | Okamura et al. | |
| 8,670,218 B1 | 3/2014 | Zeltser et al. | |
| 8,749,926 B1 | 6/2014 | Le et al. | |
| 8,837,092 B2* | 9/2014 | Covington | G11B 5/3932 360/324 |
| 9,076,468 B1* | 7/2015 | Keener | G11B 5/3932 |
| 9,165,574 B2 | 10/2015 | Covington et al. | |
| 9,384,763 B1 | 7/2016 | Liu et al. | |
| 9,552,834 B1* | 1/2017 | Sapozhnikov | G11B 5/3912 |
| 10,249,329 B1* | 4/2019 | Hu | G11B 5/3912 |

(Continued)

OTHER PUBLICATIONS

Maat, Stefan et al.; Physics and Design of Hard Disk Drive Magnetic Recording Read Heads; Handbook on Spintronics, Springer ;10.1007/978-94-007-7604-3_35-1, 2014 (52 pages).

(Continued)

*Primary Examiner* — Jefferson A Evans
(74) *Attorney, Agent, or Firm* — Patterson & Sheridan, LLP; Steven H. Versteeg

(57) ABSTRACT

The present disclosure generally related to read heads having dual free layer (DFL) sensors. The read head has a sensor disposed between two shields. The sensor is a DFL sensor and has a surface at the media facing surface (MFS). Behind the DFL sensor, and away from the MFS, is a rear hard bias (RHB) structure. The RHB structure is disposed between the shields as well. In between the DFL sensor and the RHB structure is insulating material. The RHB is disposed on the insulating material. The RHB includes a RHB seed layer as well as a RHB bulk layer. The RHB seed layer has a thickness of between 26 Angstroms and 35 Angstroms. The RHB seed layer ensures the read head has a strong RHB magnetic field that can be uniformly applied.

18 Claims, 14 Drawing Sheets

(56) References Cited

U.S. PATENT DOCUMENTS

| | | | |
|---|---|---|---|
| 10,777,222 B1* | 9/2020 | Liu | G11B 5/3906 |
| 2006/0092582 A1* | 5/2006 | Gill | G11B 5/3909 |
| | | | 360/324.12 |
| 2009/0034133 A1* | 2/2009 | Miyauchi | G11B 5/3932 |
| | | | 360/324 |
| 2011/0014390 A1 | 1/2011 | Zhou et al. | |
| 2012/0129007 A1 | 5/2012 | Zheng et al. | |
| 2012/0161263 A1 | 6/2012 | Maat et al. | |
| 2014/0293475 A1* | 10/2014 | Degawa | G11B 5/3912 |
| | | | 360/75 |
| 2015/0062757 A1* | 3/2015 | Dimitrov | G11B 5/398 |
| | | | 360/235.4 |
| 2015/0154991 A1* | 6/2015 | Le | G11B 5/398 |
| | | | 360/97.11 |
| 2015/0221325 A1* | 8/2015 | Ho | G11B 5/3912 |
| | | | 360/125.03 |
| 2016/0055866 A1* | 2/2016 | Le | G11B 5/39 |
| | | | 360/75 |
| 2016/0055868 A1* | 2/2016 | Gao | G01R 1/18 |
| | | | 360/75 |
| 2018/0308514 A1* | 10/2018 | Li | G11B 5/3932 |

OTHER PUBLICATIONS

Zhou, Yuchen; "Low noise dual free-layer magneto resistive sensor with coupled resonance"; Journal of Applied Physics, vol. 105, Issue 7, 2009 (4 pages).

* cited by examiner

EFFECTIVE REAR HARD BIAS FOR DUAL FREE LAYER READ HEADS

BACKGROUND OF THE DISCLOSURE

Field of the Disclosure

Embodiments of the present disclosure generally relate to a dual free layer (DFL) tunnel magnetic resistive (TMR) read head having a rear hard bias (RHB) structure.

Description of the Related Art

Read heads typically include an antiferromagnetic (AFM) layer, which results in a fairly large spacing between shields. A read head without an AFM layer can shrink the distance between shields while also eliminating head instabilities that come from thermal fluctuations in AFM grains.

One such read head is a dual free layer (DFL) read head that has a DFL sensor. A DFL read head does not have an AFM layer, but instead has two free layers individually stabilized longitudinally by antiferromagnetically coupled (AFC) soft bias (SB) structures on either side of the sensor between the shields. The DFL sensor operates in a scissor mode when transversally biased at the stripe back edge by a permanent magnetic or rear head bias (RHB) structure that delivers twice as high of a readout amplitude with self-noise cancellation. One major challenge in a DFL read head is that the RHB provides a strong field. The RHB field needs to not only be strong, but also needs to be uniformly applied to enable the free layers to operate in the scissor mode. When operating in scissor mode, the DFL read head can deliver much larger readout amplitudes and reduced magnetic noise.

Therefore, there is a need in the art for an improved DFL read head with a strong RHB magnetic field that can be uniformly applied.

SUMMARY OF THE DISCLOSURE

The present disclosure generally relates to read heads having dual free layer (DFL) sensors. The read head has a sensor disposed between two shields. The sensor is a DFL sensor and has a surface at the media facing surface (MFS). Behind the DFL sensor, and away from the MFS, is a rear hard bias (RHB) structure. The RHB structure is disposed between the shields as well. In between the DFL sensor and the RHB structure is insulating material. The RHB is disposed on the insulating material. The RHB includes a RHB seed layer as well as a RHB bulk layer. The RHB seed layer has a thickness of between 26 Angstroms and 35 Angstroms. The RHB seed layer ensures the read head has a strong RHB magnetic field that can be uniformly applied.

In one embodiment, a magnetic read head comprises: a first shield; a second shield spaced from the first shield; a sensor disposed between the first shield and the second shield; and a rear hard bias (RHB) structure disposed between the first shield and the second shield, and behind the sensor, wherein the RHB structure comprises: a RHB seed layer, wherein the RHB seed layer has a thickness that is greater than or equal to 26 Angstroms and less than or equal to 35 Angstroms; and a RHB bulk layer.

In another embodiment, a magnetic read head comprises: a dual free layer (DFL) sensor; a read hard bias (RHB) structure, wherein the RHB structure comprises a RHB seed layer having a thickness that is both greater than or equal to 26 Angstroms and less than or equal to 35 Angstroms; and an insulating material disposed between the DFL sensor and the RHB seed layer.

In another embodiment, a magnetic read head comprises: a first shield; a middle shield; a second shield; a first sensor disposed between the first shield and the middle shield; a second sensor disposed between the middle shield and the second shield; a first rear hard bias (RHB) structure disposed between the first shield and the middle shield; and a second RHB structure disposed between the middle shield and the second shield, wherein at least one of the first RHB structure and the second RHB structure includes a first seed layer having a thickness that is both greater than or equal to 26 Angstroms and less than or equal to 35 Angstroms.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to read heads having dual free layer (DFL) sensors. The read head has a sensor disposed between two shields. The sensor is a DFL sensor and has a surface at the media facing surface (MFS). Behind the DFL sensor, and away from the MFS, is a rear hard bias (RHB) structure. The RHB structure is disposed between the shields as well. In between the DFL sensor and the RHB structure is insulating material. The RHB is disposed on the insulating material. The RHB includes a RHB seed layer as well as a RHB bulk layer. The RHB seed layer has a thickness of between 26 Angstroms and 35 Angstroms. The RHB seed layer ensures the read head has a strong RHB magnetic field that can be uniformly applied.

Figure 1:
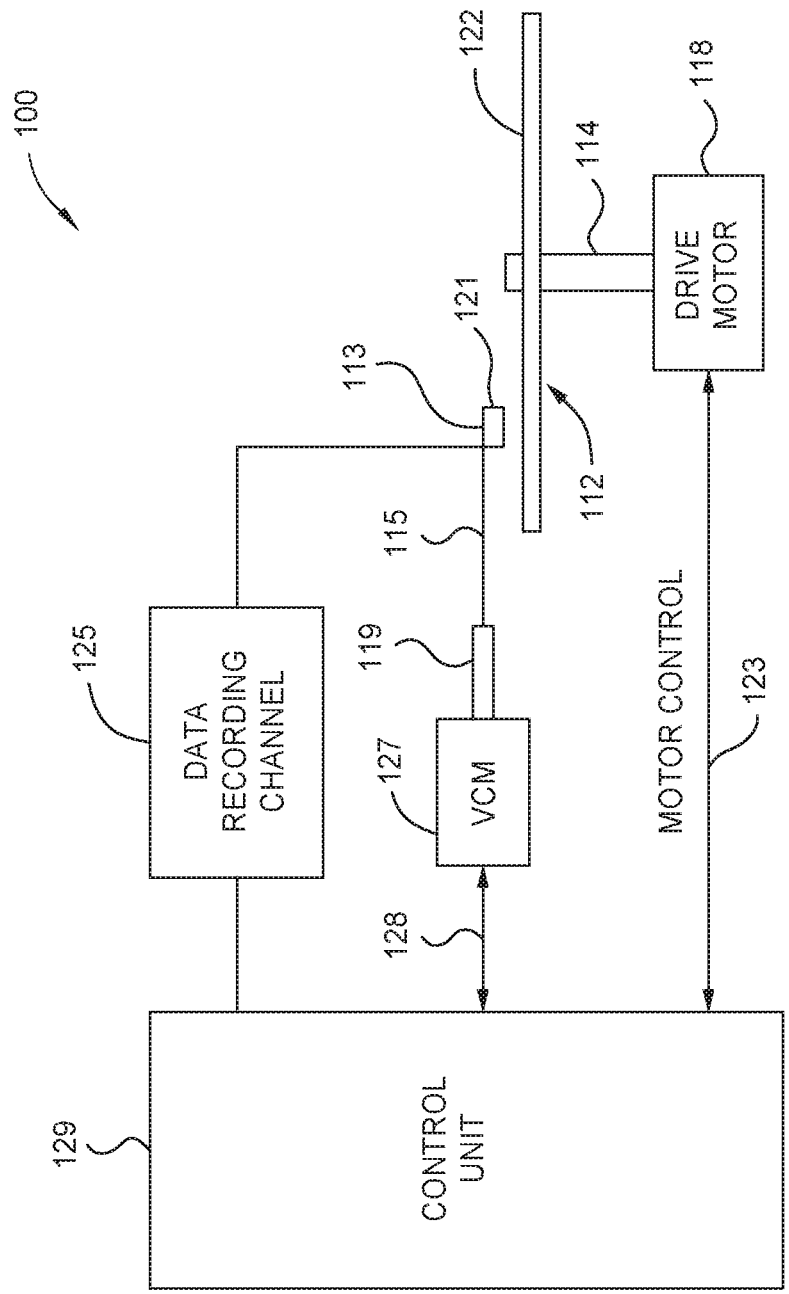
FIG. 1 is a schematic illustration of certain embodiments of a magnetic media drive including a magnetic read head.

FIG. 1 is a schematic illustration of certain embodiments of a magnetic media drive 100 including a magnetic write head and a magnetic read head. The magnetic media drive 100 may be a single drive/device or comprise multiple drives/devices. The magnetic media drive 100 includes a magnetic recording medium, such as one or more rotatable magnetic disk 112 supported on a spindle 114 and rotated by a drive motor 118. For the ease of illustration, a single disk drive is shown according to one embodiment. The magnetic recording on each magnetic disk 112 is in the form of any suitable patterns of data tracks, such as annular patterns of concentric data tracks (not shown) on the magnetic disk 112.

At least one slider 113 is positioned near the magnetic disk 112. Each slider 113 supports a head assembly 121 including one or more read/write heads, such as a write head and a read head comprising a TMR device. As the magnetic disk 112 rotates, the slider 113 moves radially in and out over the disk surface 122 so that the head assembly 121 may access different tracks of the magnetic disk 112 where desired data are written or read. Each slider 113 is attached to an actuator arm 119 by way of a suspension 115. The suspension 115 provides a slight spring force which biases the slider 113 toward the disk surface 122. Each actuator arm 119 is attached to an actuator 127. The actuator 127 as shown in FIG. 1 may be a voice coil motor (VCM). The VCM includes a coil movable within a fixed magnetic field, the direction and speed of the coil movements being controlled by the motor current signals supplied by control unit 129.

During operation of the magnetic media drive 100, the rotation of the magnetic disk 112 generates an air or gas bearing between the slider 113 and the disk surface 122 which exerts an upward force or lift on the slider 113. The air or gas bearing thus counter-balances the slight spring force of suspension 115 and supports slider 113 off and slightly above the disk surface 122 by a small, substantially constant spacing during normal operation.

The various components of the magnetic media drive 100 are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from the head assembly 121 by way of recording channel 125. Certain embodiments of a magnetic media drive of FIG. 1 may further include a plurality of media, or disks, a plurality of actuators, and/or a plurality number of sliders.

Figure 2:
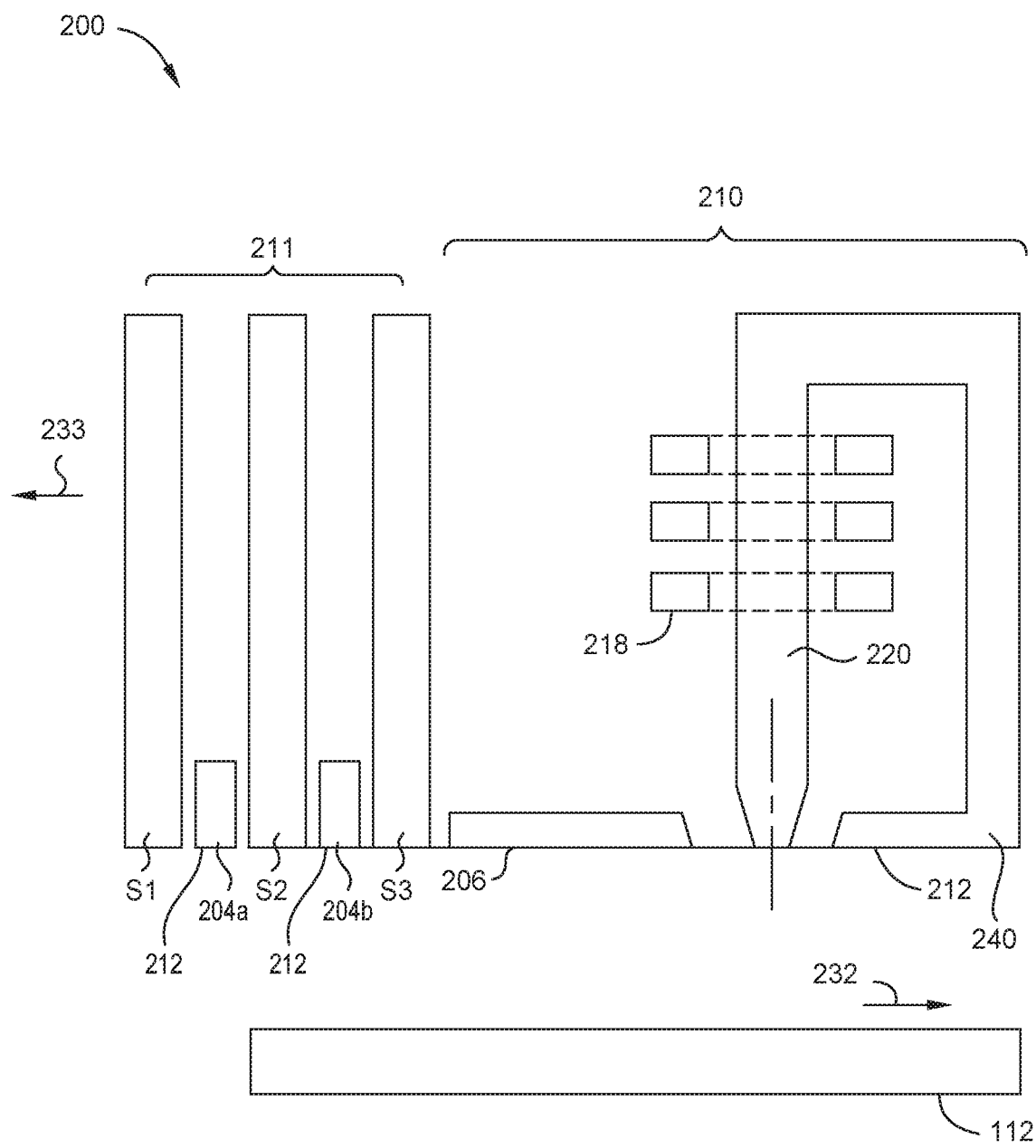
FIG. 2 is a schematic illustration of certain embodiments of a cross sectional side view of a head assembly facing a magnetic storage medium.

FIG. 2 is a schematic illustration of certain embodiments of a cross sectional side view of a head assembly 200 facing the magnetic disk 112 or other magnetic storage medium. The head assembly 200 may correspond to the head assembly 121 described in FIG. 1. The head assembly 200 includes a media facing surface (MFS) 212 facing the magnetic disk 112. As shown in FIG. 2, the magnetic disk 112 relatively moves in the direction indicated by the arrow 232 and the head assembly 200 relatively moves in the direction indicated by the arrow 233.

The head assembly 200 includes a magnetic read head 211. The magnetic read head 211 includes a first sensing element 204a disposed between shields S1 and S2, and a second sensing element 204b disposed between the shields S2 and S3. The sensing element 204a and the shields S1 and S2 each have a MFS 212 facing the magnetic disk 112. The sensing element 204b and the shields S2 and S3 each have a MFS 212 facing the magnetic disk 112. The sensing elements 204a, 204b are TMR devices sensing the magnetic fields of the recorded bits, such as perpendicular recorded bits or longitudinal recorded bits, in the magnetic disk 112 by a TMR effect. In certain embodiments, the spacing between shields S1 and S2 and the spacing between shields S2 and S3 is about 17 nm or less.

The head assembly 200 may optionally include a write head 210. The write head 210 includes a main pole 220, a leading shield 206, and a trailing shield (TS) 240. The main pole 220 comprises a magnetic material and serves as a main electrode. Each of the main pole 220, the leading shield 206, and the TS 240 has a front portion at the MFS 212. The write head 210 includes a coil 218 around the main pole 220 that excites the main pole 220 producing a writing magnetic field for affecting a magnetic recording medium of the rotatable magnetic disk 112. The coil 218 may be a helical structure or one or more sets of pancake structures. The TS 240 comprises a magnetic material, serving as a return pole for the main pole 220. The leading shield 206 may provide electromagnetic shielding and is separated from the main pole 220 by a leading gap 254.

Figure 3A:
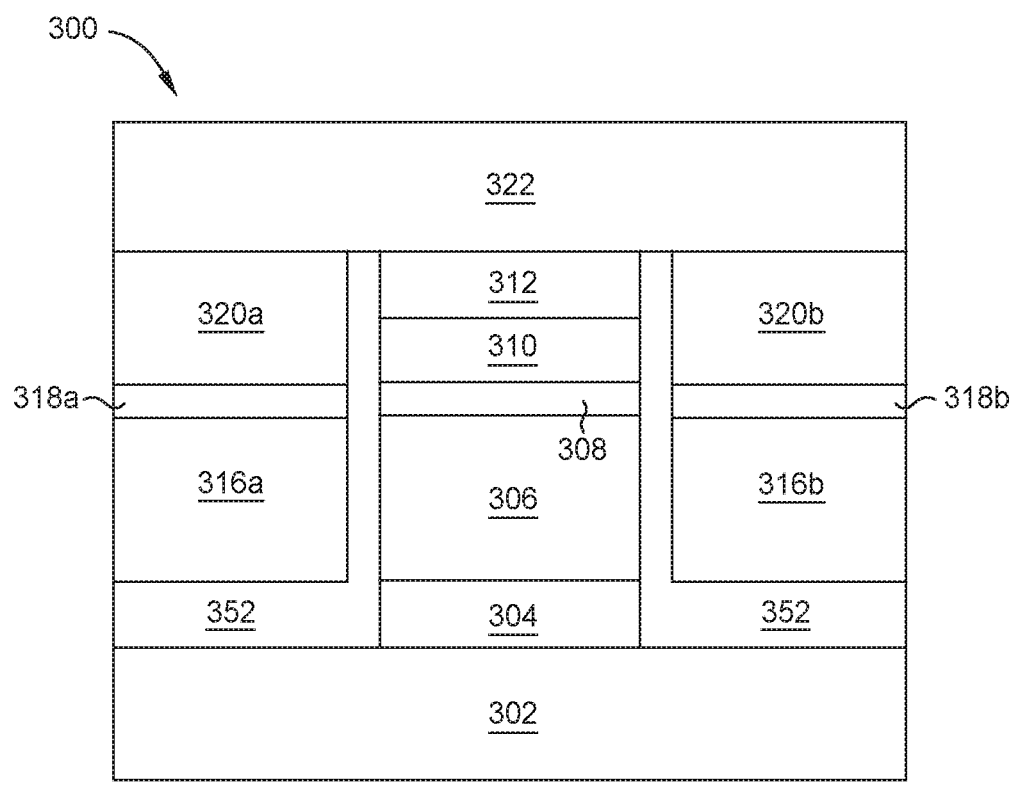
FIGS. 3A-3B are schematic illustrations of a single read head, according to various embodiments.
Figure 3B:
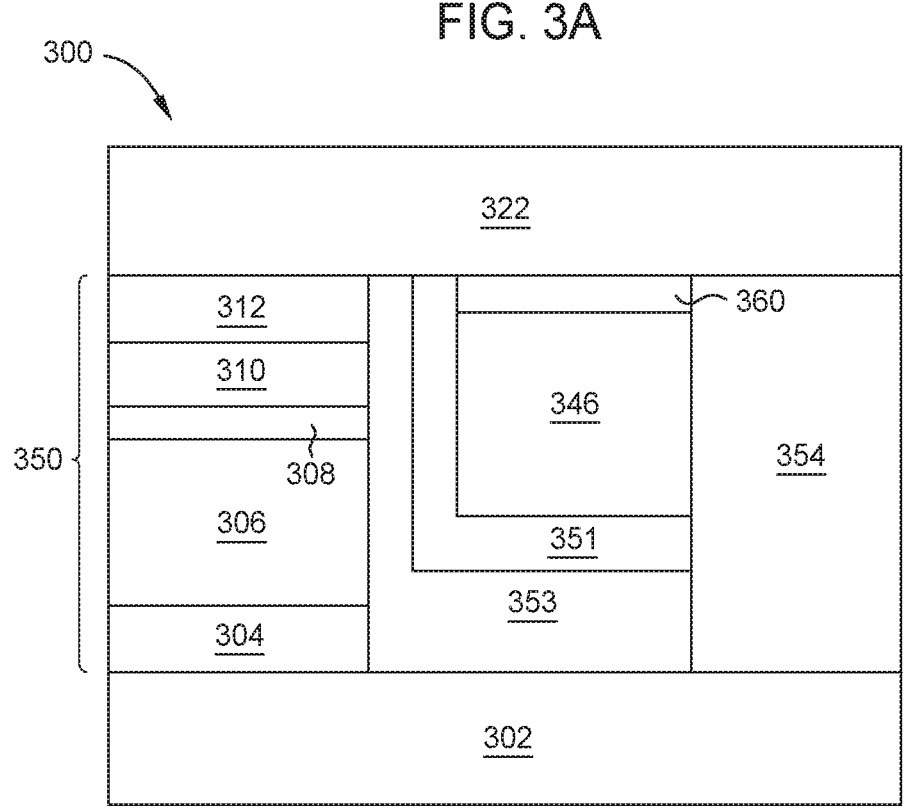

FIGS. 3A-3B are schematic illustrations of a single read head 300. Aspects of FIGS. 3A-3B may be similar to the components of the magnetic read head 211. FIG. 3A is an MFS view of a single read head 300 of a dual free layer (DFL) sensor. The single read head 300 includes first shield (S1) 302, a seed layer 304, a first free layer (FL) 306, a barrier layer 308, a second FL 310, a cap 312, a second shield (S2) 322, and an insulation material 352. The seed layer 304, first FL 306, barrier layer 308, second FL 310, and cap 312 collectively may be referred to as the DFL sensor stack 350. It is understood that other materials not listed for each of the layers described herein are contemplated and the embodiments discussed herein are not limited to the materials listed for each of the layers of the DFL sensor. In the embodiments discussed herein, the seed layer, the first FL, the barrier layer, the second FL, and the cap may be referred to as a MTJ stack.

The S1 302 includes a magnetic permeable and electrically conductive material selected from the group that includes NiFe, CoFe, NiFeCo, alloys, and their combinations. S2 322 includes a magnetic permeable and electrically conductive material selected from the same group of materials as S1 302, or the same material exchange biased by a manganese based antiferromagnet such as IrMn, PtMn, and NiMn, or the combination of the two. The thickness of each of the S1 302 and the S2 322 may be between about 10 nm and about 500 nm. S1 302 and S2 322 are deposited by well-known deposition methods such as electroplating, electroless plating, or sputtering, or their combinations. Additionally, it is to be understood that while NiFe, CoFe, NiFeCo, IrMn, PtMn and NiMn have been exemplified as the S1 302 and S2 322 materials, other materials are contemplated and the embodiments discussed herein are not limited to NiFe, CoFe, NiFeCo, IrMn, PtMn and NiMn for the S1 302 and the S2 322.

A seed layer 304 is formed on the S1 302. The seed layer 304 is deposited by well-known deposition methods such as sputtering. The seed layer 304 includes a material selected from the group that includes tantalum (Ta), ruthenium (Ru), titanium (Ti) and their multilayers or alloys thereof. The seed layer 304 may have a thickness of between about 10 Angstroms to about 50 Angstroms. Additionally, it is to be understood that while Ta, Ru, Ti and their multilayers and alloys have been exemplified as the seed layer 304 materials, other materials are contemplated and the embodiments discussed herein are not limited to Ta, Ru, or Ti or their multilayers or alloys for the seed layer 304. For example, suitable materials for the seed layer 304 may also include Co, Hf, Zr, and alloys thereof such as CoHf and CoZr.

The first FL 306 is formed on the seed layer 304. The first FL 306 includes a CoFexB/CoFe multilayer stack. The CoFe layer may have a thickness of between about 3 Angstroms to about 10 Angstroms. The CoFexB layer may have a thickness of between about 30 Angstroms to about 100 Angstroms with x between 0 and 1 (i.e., the layer may have a non-stoichiometric amount of Fe). The first FL 306 may be formed by well-known deposition methods such as sputtering. Additionally, it is to be understood that while CoFexB/CoFe has been exemplified as the first FL 306 material, other materials are contemplated and the embodiments discussed herein are not limited to CoFexB/CoFe for the first FL 306.

The barrier layer 308 is formed on the first FL 306. The barrier layer 308 includes a material such as magnesium oxide (MgO) with a thickness of between about 10 Angstroms to about 20 Angstroms. It is to be understood that while MgO is exemplified as the barrier layer 308, other insulating materials are contemplated and the embodiments discussed herein are not limited to MgO for the barrier layer 308.

The second FL 310 is formed on the barrier layer 308. The second FL 310 includes a CoFe/CoFexB multilayer stack. The CoFe layer may have a thickness of between about 3 Angstroms to about 10 Angstroms. The CoFexB layer may have a thickness of between about 30 Angstroms to about 100 Angstroms and x between 0 and 1 (i.e., the layer may have a non-stoichiometric amount of Fe). The second FL 310 may be formed by well-known deposition methods such as sputtering. Additionally, it is to be understood that while CoFe/CoFexB has been exemplified as the second FL 310 material, other materials are contemplated and the embodiments discussed herein are not limited to CoFe/CoFexB for the second FL 310. The magnetic moments for the first FL 306 and the second FL 310 may be antiparallel due to the antiparallel biasing from the SAF SB.

The cap 312 is formed on the second FL 310. The cap 312 includes a material selected from the group that includes tantalum (Ta), ruthenium (Ru), titanium (Ti), other non-magnetic, electrically conductive materials and their multilayers. The cap 312 may be formed by well-known deposition methods such as sputtering. The cap 312 may have a thickness of between about 10 Angstroms to about 100 Angstroms. Additionally, it is to be understood that while Ta, Ru, Ti and their multilayers have been exemplified as the cap 312 materials, other materials are contemplated and the embodiments discussed herein are not limited to Ta, Ru, or Ti or their multilayers for the cap 312. For example, suitable materials for the cap 312 may also include Co, Hf, Zr, and alloys thereof such as CoHf and CoZr.

The single read head 300 further includes a first synthetic antiferromagnetic (SAF) soft bias (SB) (e.g., a side shield) that includes a first lower SB 316a, a first spacer 318a, and a first upper SB 320a and a second SAF SB that includes a second lower SB 316b, a second spacer 318b, and a second upper SB 320b. The first lower SB 316a and the second lower SB 316b each includes a material selected from the group that includes NiFe, CoFe, CoNi, CoFeNi, CoFeB, Co, and alloys thereof. The first lower SB 316a and the second lower SB 316b may be formed by well-known deposition methods such as sputtering. The first lower SB 316a and the second lower SB 316b may each have a thickness of between about 50 Angstroms to about 150 Angstroms. Additionally, it is to be understood that while NiFe, CoFe, CoNi, CoFeNi, CoFeB, and Co have been exemplified as the cap 312 materials, other materials are contemplated and the embodiments discussed herein are not limited to NiFe, CoFe, CoNi, CoFeNi, CoFeB, and Co for the first lower SB 316a and the second lower SB 316b.

The first spacer 318a is formed on the first lower SB 316a and the second spacer 318b is formed on the second lower SB 316b. Suitable material for the first spacer 318a and the second spacer 318b includes ruthenium (Ru) at a thickness of between about 4 Angstroms to about 10 Angstroms. It is to be understood that while Ru has been exemplified as the first spacer 318a and the second spacer 318b material, other materials are contemplated and the embodiments discussed herein are not limited to Ru for the first spacer 318a and the second spacer 318b.

The first upper SB 320a and the second upper SB 320b each includes a material selected from the group that includes NiFe, CoFe, CoNi, CoFeNi, CoFeB, Co, and alloys thereof. The first upper SB 320a and the second upper SB 320b may be formed by well-known deposition methods such as sputtering. The first upper SB 320a and the second upper SB 320b may each have a thickness of between about 50 Angstroms to about 200 Angstroms. Additionally, it is to be understood that while NiFe, CoFe, CoNi, CoFeNi, CoFeB, and Co have been exemplified as the first upper SB 320a and the second upper SB 320b materials, other materials are contemplated and the embodiments discussed herein are not limited to NiFe, CoFe, CoNi, CoFeNi, CoFeB, and Co for the first upper SB 320a and the second upper SB 320b. In various embodiments, a capping layer, similar to the cap 312, may be formed on both the first upper SB 320a and the second upper SB 320b. The capping layer may have a thickness of between about 0 Angstroms to about 100 Angstroms.

The insulation material 352 may be placed in the single read head 300, such that electrical shorting between the S1 302, the seed layer 304, the first FL 306, the barrier layer 308, the second FL 310, the cap 312, the S2 322, the first SAF SB, and the second SAF SB may be avoided. Suitable materials for the insulation material 352 include dielectric materials such as aluminum oxide, magnesium oxide, silicon oxide, and silicon nitride. The insulation material 352 may be formed by well-known deposition methods such as atomic layer deposition (ALD) or sputtering. The insulation material 352 may have a thickness of between about 10 Angstroms to about 50 Angstroms.

In one embodiment, the first lower SB 316a and the second lower SB 316b are identical. Furthermore, the first upper SB 320a and the second upper SB 320b are identical. Also, the first spacer 318a and the second spacer 318b are identical.

FIG. 3B is an APEX view of a single read DFL head 300. The single DFL read head 300 further includes a rear hard bias (RHB) 346, insulation materials 353 and 354, a non-magnetic layer 360, and a RHB seed layer 351. The RHB 346 generates a magnetic field pointing towards the insulation material 354 and away from the following layers: the first FL 306, the barrier layer 308, the second FL 310, the cap 312, and the insulation material 353. Stated another way, the magnetic field of the RHB 346 is along an axis that is perpendicular to the MFS plane. The RHB 346 may include cobalt platinum (CoPt), and is magnetically decoupled from S2 322 by inserting a non-magnetic layer 360 between the RHB 346 and the S2 322. The non-magnetic cap layer 360 may include a material selected from the group that includes tantalum (Ta), ruthenium (Ru), titanium (Ti), alumina ($Al_2O_3$), silicon dioxide, and other non-magnetic materials.

Suitable materials for the insulation material 353 include dielectric materials such as aluminum oxide ($Al_2O_3$), magnesium oxide, silicon oxide, and silicon nitride. The insulation material 353 may be formed by well-known deposition methods such as atomic layer deposition (ALD) or sputtering. The insulation material 353 may have a thickness of between about 10 Angstroms to about 50 Angstroms.

The RHB 346 is deposited on the RHB seed layer 351. The RHB seed layer 351 includes a material selected from the group that includes tantalum (Ta), tungsten (W), ruthenium (Ru), nitrides and alloys thereof. Additionally, it is to be understood that while Ta, W, and Ru have been exemplified as the RHB seed layer 351 materials, other materials are contemplated and the embodiments discussed herein are not limited to Ta, W, or Ru for the RHB seed layer 351. The RHB seed layer 351 may be deposited by well-known deposition methods such as sputtering. Furthermore, the RHB seed layer 351 may have a thickness of about 26 Angstroms to about 35 Angstroms. Additionally, it is contemplated that the RHB seed layer 351 may comprise multiple layers.

Suitable materials for the insulation material 354 include dielectric materials such as aluminum oxide, silicon oxide, and silicon nitride. The insulation material 354 may be formed by well-known deposition methods such as sputtering. The insulation material 354 may have a thickness between about 400 Angstroms and about 800 Angstroms.

Figure 4A:
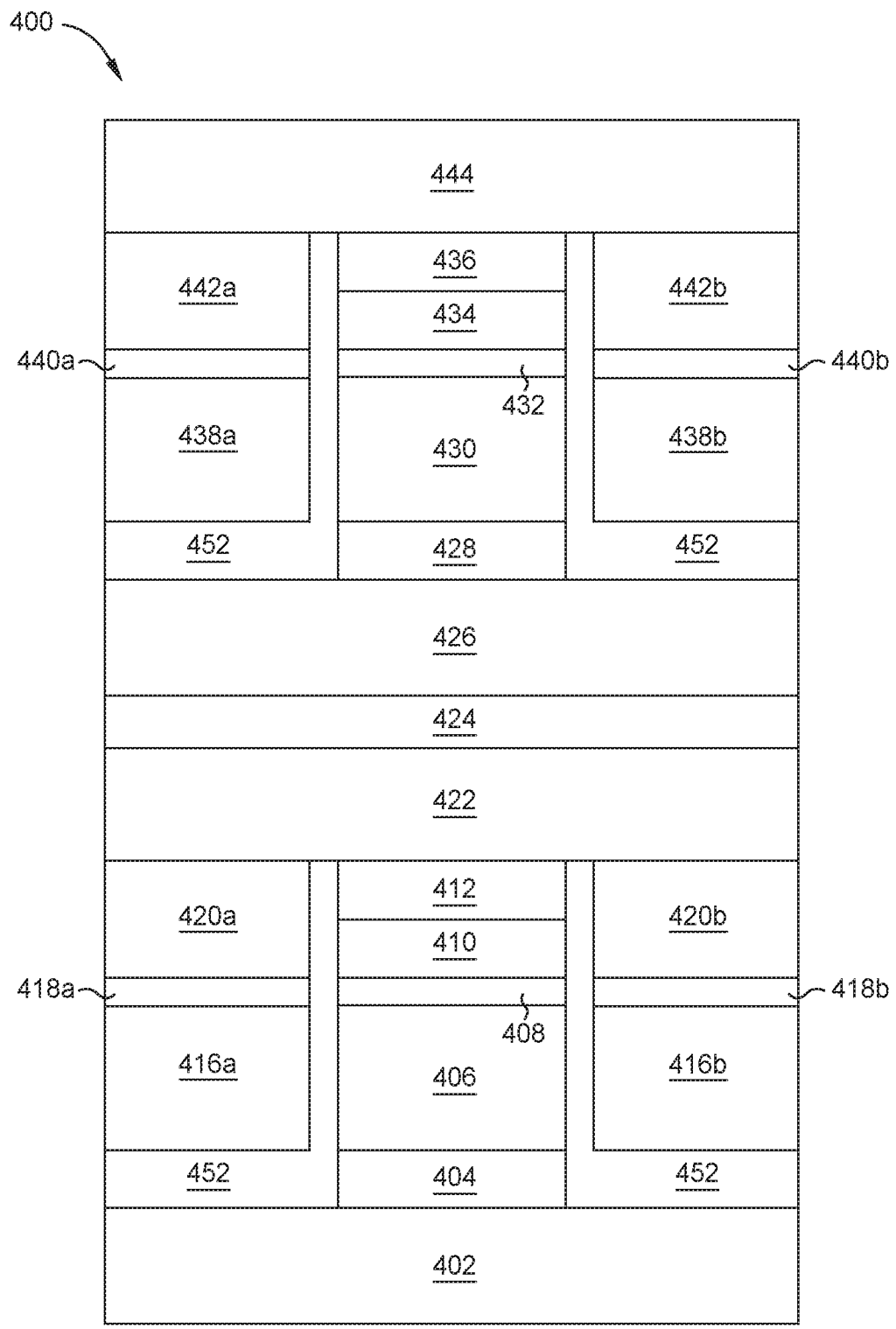
FIGS. 4A-4B are schematic illustrations of a TDMR read head, according to one embodiment.
Figure 4B:
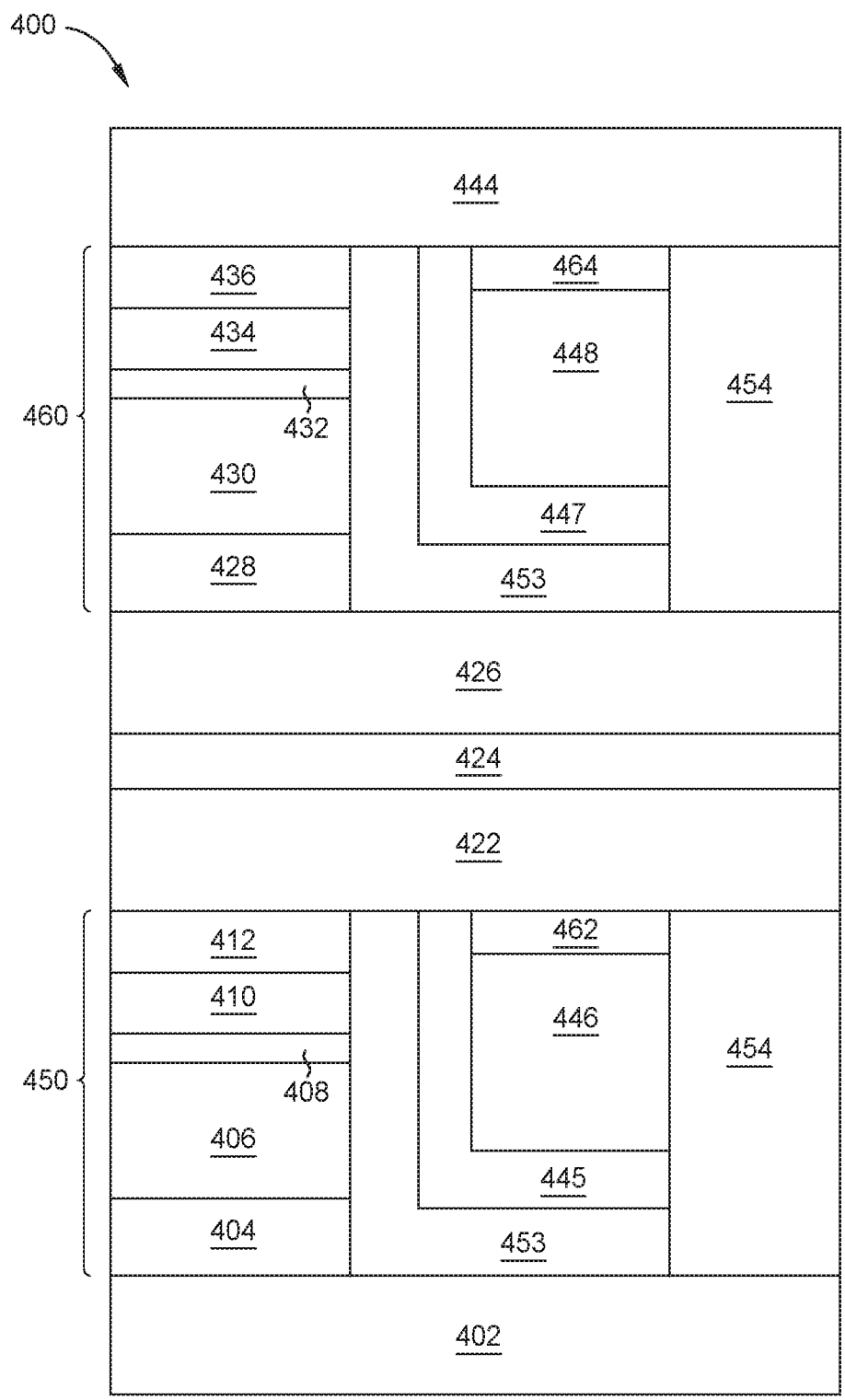

FIGS. 4A-4B are schematic illustrations of a TDMR DFL read head 400 according to one embodiment that contains two DFL sensor stacks 450, 460. Aspects of FIGS. 3A-3B may be similar to the description of the TDMR read head 400 of FIGS. 4A-4B. More specifically, the materials and thickness from the discussion of FIGS. 3A-3B are applicable to the discussion of FIGS. 4A-4B FIG. 4A is an ABS view of a TDMR read head 400, according to one embodiment. The TDMR read head 400 includes a first DFL read head portion that includes first shield (S1) 402, a seed layer 404, a first free layer (FL) 406, a barrier layer 408, a second FL 410, a cap 412, a second shield (S2) 422, and an insulation material 452. It is understood that other materials not listed for each of the layers described herein are contemplated and the embodiments discussed herein are not limited to the materials listed for each of the layers of the DFL sensor. In the embodiments discussed herein, the seed layer, the first FL, the barrier layer, the second FL, and the cap may be referred to as a MTJ stack.

The seed layer 404 includes a material selected from the group that includes tantalum, ruthenium, titanium, and combinations thereof. For example, suitable materials for the seed layer 404 may also include Co, Hf, Zr, and alloys thereof such as CoHf and CoZr. The first DFL read head portion further includes a first SAF SB that includes a first lower SB 416a, a first spacer 418a, and a first upper SB 420a and a second SAF SB that includes a second lower SB 416b, a second spacer 418b, and a second upper SB 420b. The magnetic moments for the first FL 406 and the second FL 410 may be antiparallel due to the antiparallel biasing from the SAF SB.

An insulating read separation gap (RSG) 424 separates the first DFL read head portion and the second DFL read head portion. The insulating RSG 424 may be formed by an oxide compound, such as $Al_2O_3$, or any other suitable insulating material.

The TDMR read head 400 further includes the second DFL read head portion that includes a first shield (S1) 426, a seed layer 428, a first free layer (FL) 430, a barrier layer 432, a second FL 434, a cap 436, a second shield (S2) 444, and an insulation material 452. The seed layer 428 includes a material selected from the group that includes tantalum, ruthenium, titanium, and combinations thereof. For example, suitable materials for the seed layer 304 may also include Co, Hf, Zr, and alloys thereof such as CoHf and CoZr. The second DFL read head portion further includes a first SAF SB that includes a first lower SB 438a, a first spacer 440a, and a first upper SB 442a and a second SAF SB that includes a second lower SB 438b, a second spacer 440b, and a second upper SB 442b. The magnetic moments for the first FL 430 and the second FL 434 may be antiparallel due to the antiparallel biasing from the SAF SB.

FIG. 4B is an APEX view of a TDMR read head 400, according to another embodiment. The first DFL read head portion further includes a rear hard bias (RHB) 446, insulation materials 453 and 454, a non-magnetic layer 462, and a RHB seed layer 445. The RHB 446 generates a magnetic field pointing towards the insulation material 454 and away from the following layers: the first FL 406, the barrier layer 408, the second FL 410, the cap 412 and the insulation material 453. Stated another way, the magnetic field of the RHB 446 is along an axis that is perpendicular to the MFS plane. The RHB 446 may include cobalt platinum (CoPt), and is magnetically decoupled from S2 422 by inserting a non-magnetic layer 462 between the RHB 446 and the S2 422. The non-magnetic layer 462 may include a material selected from the group that includes tantalum (Ta), ruthenium (Ru), titanium (Ti), alumina ($Al_2O_3$), silicon dioxide ($SiO_2$) and other non-magnetic, electrically conductive materials.

Suitable materials for the insulation material 452 include dielectric materials such as aluminum oxide ($Al_2O_3$), silicon oxide, and silicon nitride. The insulation material 452 may be formed by well-known deposition methods such as atomic layer deposition (ALD) or sputtering. The insulation material 452 may have a thickness of between about 10 Angstroms to about 50 Angstroms.

The RHB 446 is deposited on the RHB seed layer 445. The RHB seed layer 445 includes a material selected from the group that includes tantalum (Ta), tungsten (W), ruthenium (Ru), nitrides and alloys thereof. Additionally, it is to be understood that while Ta, W, and Ru have been exemplified as the RHB seed layer 445 materials, other materials are contemplated and the embodiments discussed herein are not limited to Ta, W, or Ru for the RHB seed layer 445. The RHB seed layer 445 may be deposited by well-known deposition methods such as sputtering. Furthermore, the RHB seed layer 445 may have a thickness of about 26 Angstroms to about 35 Angstroms. Additionally, it is contemplated that the RHB seed layer 445 may comprise multiple layers.

Suitable materials for the insulation materials 453 and 454 include dielectric materials such as aluminum oxide, silicon oxide, and silicon nitride. The insulation material 453 may be formed by well-known deposition methods such as ALD or sputtering. The insulation material 453 may have a thickness from about 10 Angstroms to about 50 Angstroms. The insulation material 454 may be formed by well-known deposition methods such as sputtering. The insulation material may have a thickness between about 400 Angstroms and about 800 Angstroms.

The second DFL read head portion further includes a RHB 448, insulation materials 453 and 454, a non-magnetic layer 464, and a RHB seed layer 447. The RHB 448 generates a magnetic field pointing towards the insulation material 454 and away from the following layers: the first FL 430, the barrier layer 432, the second FL 434, the cap 436 and the insulation layer 453. Stated another way, the magnetic field of the RHB 448 is along an axis that is perpendicular to the MFS plane. The RHB 448 may include cobalt platinum (CoPt), and it is magnetically decoupled with S2 444 by inserting a non-magnetic layer 464 between the RHB 448 and the S2 444. The non-magnetic layer 464 may include a material selected from the group that includes tantalum (Ta), ruthenium (Ru), titanium (Ti), alumina (Al$_2$O$_3$), silicon dioxide (SiO$_2$) and other non-magnetic, electrically conductive materials.

Suitable materials for the insulation material 452 include dielectric materials such as aluminum oxide (Al$_2$O$_3$), silicon oxide, and silicon nitride. The insulation material 452 may be formed by well-known deposition methods such as atomic layer deposition (ALD) or sputtering. The insulation material 452 may have a thickness of between about 10 Angstroms to about 50 Angstroms. Suitable materials for the insulation materials 453 and 454 include dielectric materials such as aluminum oxide, silicon oxide, and silicon nitride. The insulation material 453 may be formed by well-known deposition methods such as ALD or sputtering. The insulation material 453 may have a thickness from about 10 Angstroms to about 50 Angstroms. The insulation material 454 may be formed by well-known deposition methods such as sputtering. The insulation material may have a thickness between about 400 Angstroms and about 800 Angstroms.

The RHB 448 is deposited on the RHB seed layer 447. The RHB seed layer 447 includes a material selected from the group that includes tantalum (Ta), tungsten (W), ruthenium (Ru), nitrides and alloys thereof. Additionally, it is to be understood that while Ta, W, and Ru have been exemplified as the RHB seed layer 447 materials, other materials are contemplated and the embodiments discussed herein are not limited to Ta, W, or Ru for the RHB seed layer 447. The RHB seed layer 447 may be deposited by well-known deposition methods such as sputtering. Furthermore, the RHB seed layer 447 may have a thickness of about 26 Angstroms to about 35 Angstroms. Additionally, it is contemplated that the RHB seed layer 447 may comprise multiple layers.

Figure 5:
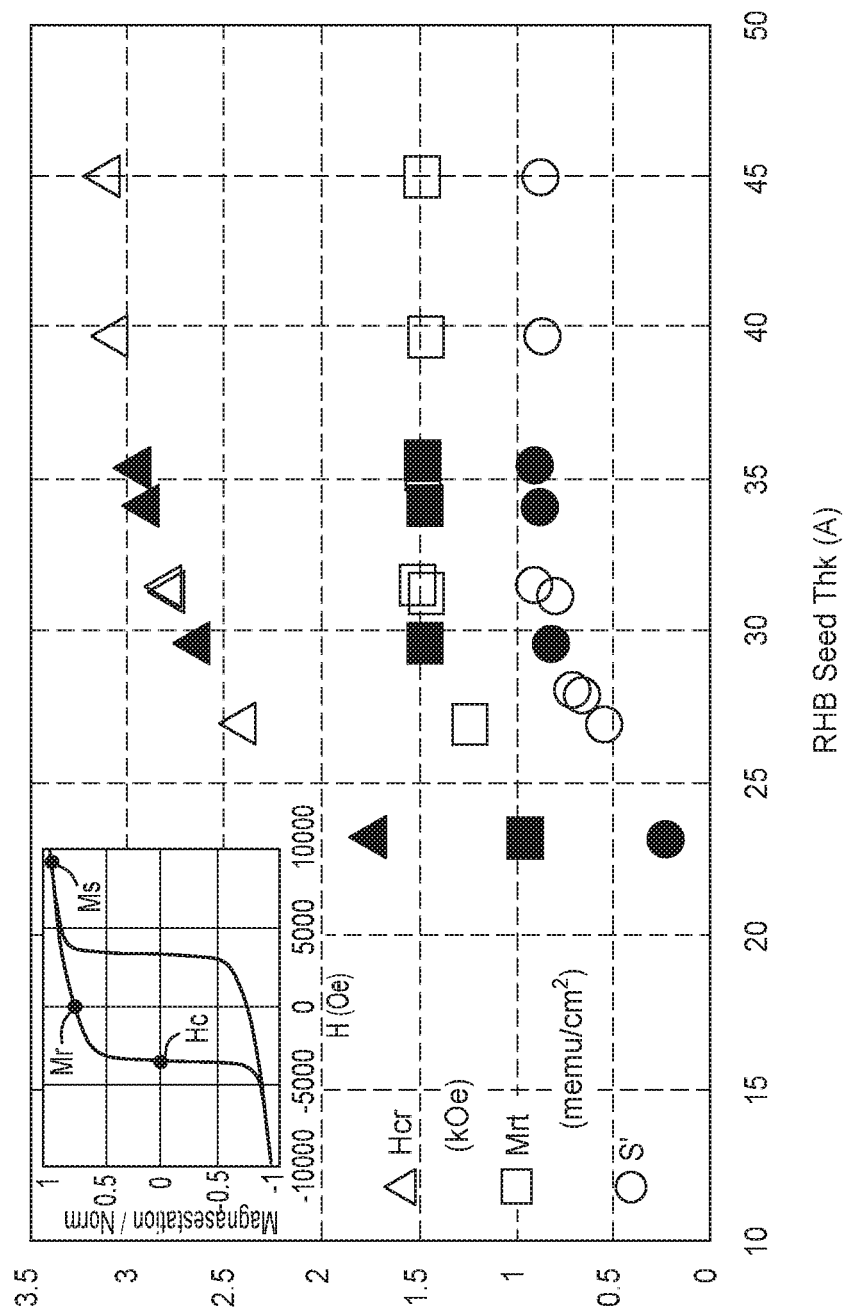
FIG. 5 is a graph illustrating the magnetic properties of a RHB stack according to various embodiments.

FIG. 5 is a graph illustrating the magnetic properties of a RHB stack according to various embodiments. The RHB seed layer thickness is graphed on the x-axis, where the RHB seed layer may be the RHB seed layer 351 of FIG. 3B, the RHB seed layer 445 of FIG. 4B, and/or the RHB seed layer 447 of FIG. 4B. The RHB coercivity (Hcr), the remnant magnetization thickness product (Mrt), and the squareness (S') are graphed on the y-axis.

The S' value increases from about 0.25 at a RHB seed layer thickness of about 23 Angstroms to about 0.9 at a RHB seed layer thickness of about 35 Angstroms. At a RHB seed layer thickness of about 35 Angstroms and larger, the S' value remains relatively constant. Furthermore, the rate of increase of the S' value decreases at a RHB seed layer thickness of about 29 Angstroms. The decrease in the rate of increase of the S' value may indicate diminishing returns as the RHB seed layer thickness is reaching an optimal thickness.

The Mrt value increases from about 0.9 memu/cm$^2$ at a RHB seed layer thickness of about 23 Angstroms to about 1.5 memu/cm$^2$ at a RHB seed layer thickness of about 29 Angstroms. At a RHB seed layer of about 29 Angstroms and larger, the Mrt value remains relatively constant at about 1.5 memu/cm$^2$ for a CoPt thickness of 200 Angstroms.

The Hcr value increases from about 1.75 kOe at a RHB seed layer thickness of about 23 Angstroms to about 2.95 kOe at a RHB seed layer thickness of about 35 Angstroms. At a RHB seed layer thickness greater than about 35 Angstroms, the Hcr value increase is minimal. The decrease in the rate of increase of the Hcr value may indicate diminishing returns as the RHB seed layer is reaching an optimal thickness.

Figure 6:
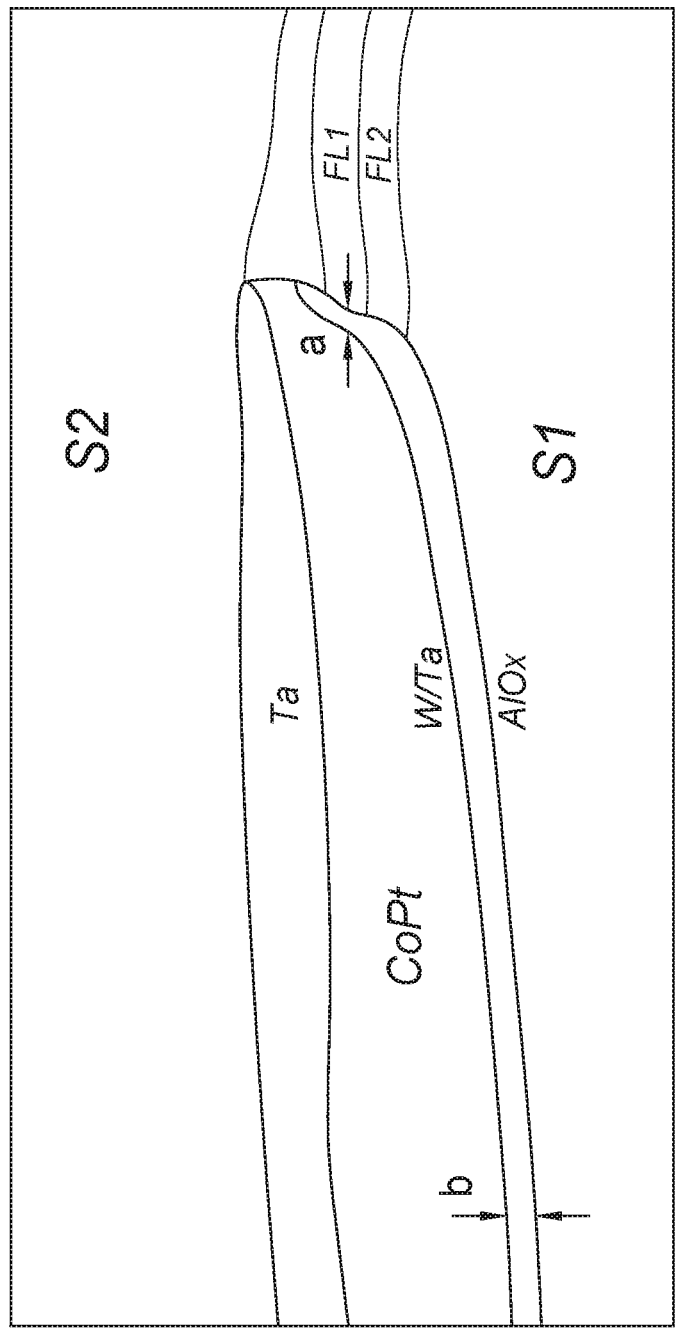
FIG. 6 is a schematic illustration of a DFL read head according to one embodiment.

FIG. 6 is a schematic illustration of a DFL read head in APEX direction according to one embodiment. The DFL read head of FIG. 6 may be the DFL read head described in FIGS. 3A, 3B, 4A, and 4B. The S1 corresponds to a first shield, such as the S1 302 of FIGS. 3A and 3B, the S1 402 of FIGS. 4A and 4B, and/or the S2 426 of FIGS. 4A and 4B. The S2 corresponds to a second shield, such as the S2 322 of FIGS. 3A and 3B, the S2 422 of FIGS. 4A and 4B, and/or the S2 444 of FIGS. 4A and 4B. The DFL read head includes a RHB stack and a MTJ stack that includes a first free layer (FL1) and a second free layer (FL2).

The DFL read head also includes an insulation material, such as the insulation material 352 of FIG. 3A or the insulation material 353 of 3B and/or the insulation material 452 of FIG. 4A or the insulation material 453 of 4B. The insulation material is formed by an AlOx compound, such as Al$_2$O$_3$, or any other suitable insulating material.

The RHB stack includes a non-magnetic layer that includes non-magnetic materials such as Ta. The non-magnetic layer may be the non-magnetic layer 360 of FIG. 3B, the non-magnetic layer 462 of FIG. 4B, and/or the non-magnetic layer 464 of FIG. 4B. Furthermore, the RHB stack includes a permanent magnet that includes a material such as CoPt. The RHB stack further includes a RHB seed layer, such as the RHB seed layer 351 of FIG. 3B, the RHB seed layer 445 of FIG. 4B, and/or the RHB seed layer 447 of FIG. 4B. The RHB seed layer may include a material such as tungsten (W), tantalum (Ta), ruthenium (Ru), combinations thereof, nitrides and alloys thereof. In one embodiment, the RHB seed layer includes a multilayer structure that includes a first layer and a second layer, where the first layer is disposed between the insulation material (AlOx) and the second layer. The first layer includes Ta with a first thickness and the second layer includes W with a second thickness. In one embodiment, the first layer has a first thickness of tantalum of about 10 Angstroms to about 19 Angstroms. The second layer has a second thickness of tungsten of about 16 Angstroms to about 25 Angstroms.

The RHB seed layer includes a first thickness (a) and a second thickness (b). The first thickness (a) separates the RHB from the insulation material. The first thickness (a) adds space between the RHB and the MTJ stack and may affect the RHB magnetic field acting on the MTJ stack. The second thickness (b) further separates the RHB from the insulation material, the MTJ stack and the S1. The second thickness (b) may isolate the RHB from the S1, such that the magnetic field exerted by the RHB is not affected by the S1. As will be discussed below, the first thickness and the second thickness can be different.

Figure 7A:
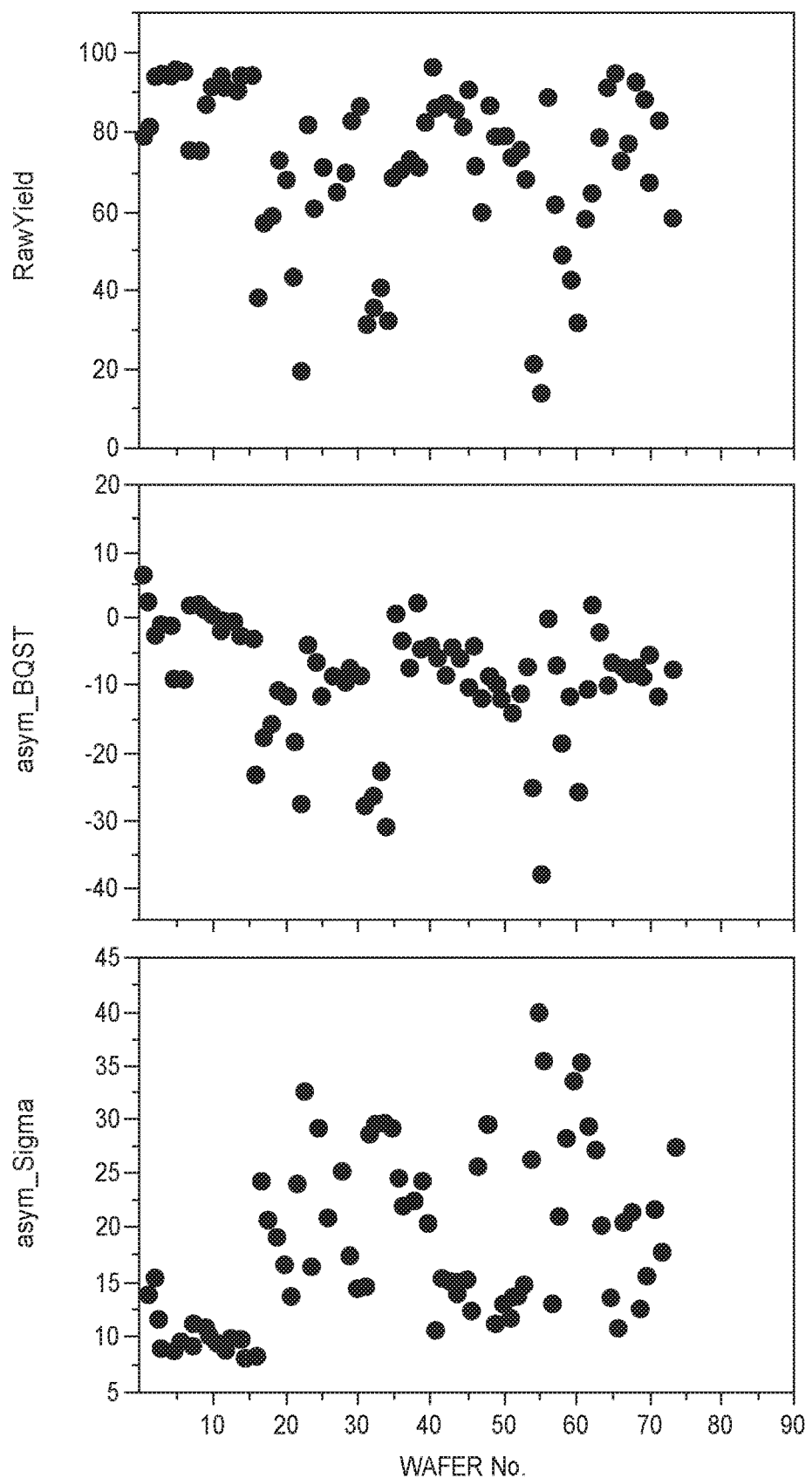
FIG. 7A is a graph illustrating the results of a bar quasistatic testing (BQST) performance for numerous devices according to one embodiment.

FIG. 7A is a graph illustrating the results of a bar quasistatic testing (BQST) performance for numerous devices according to one embodiment. For a number of wafers at about a 35 Angstrom RHB seed layer thickness tested, the range of the RawYield (BQST yield) values are about 10 to about 100%. Furthermore, the asym_BQST (asymmetry mean) values range from about 5 to about −40% with the majority of values between about 0 and about −15%. The asym_Sigma (asymmetry sigma) values range from about 7.5 to about 40%. The wide range of values for each of the wafers tested indicates that the BQST performance of the DFL read heads can be excellent at the target RHB seed thickness of 35 Angstroms but has large variability.

Figure 7B:
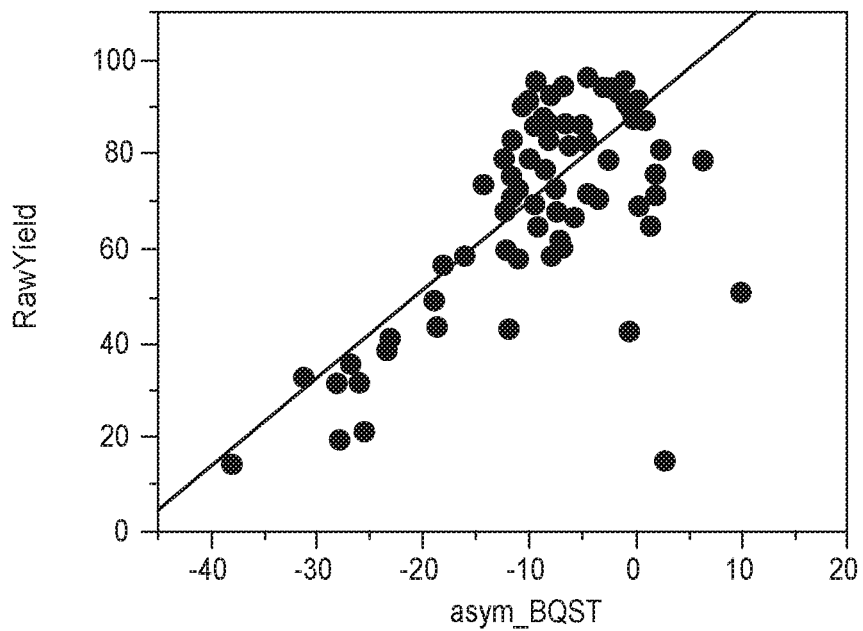
FIG. 7B is a graph illustrating main detractors of yield loss for the devices illustrated in FIG. 7A.
Figure 7B:
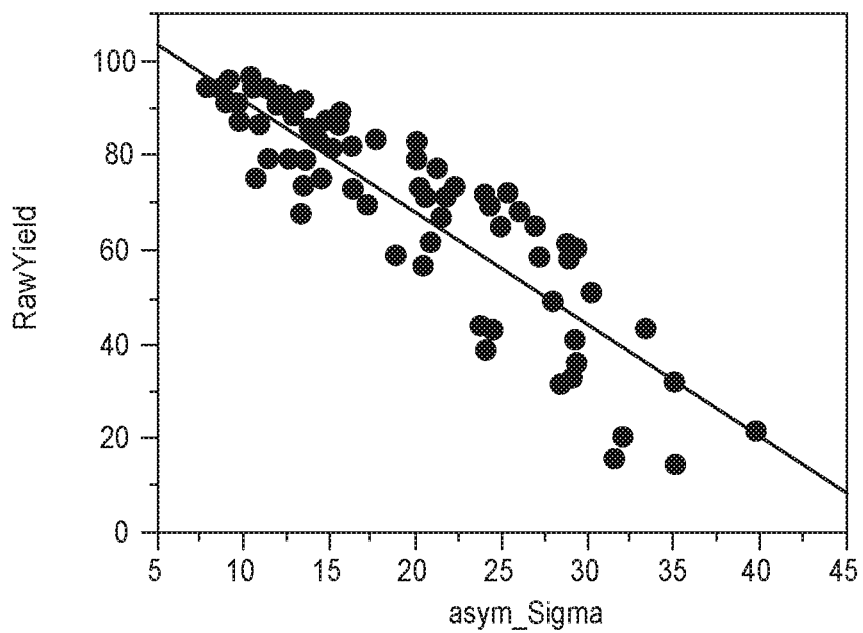

FIG. 7B is a graph illustrating main detractors to BQST yield for the devices illustrated in FIG. 7A. When plotting the RawYield versus the asym_BQST, a positive trend of values is shown when the asym_BQST increases. Furthermore, when plotting the asym_Sigma versus the RawYield, a negative trend of values is shown when the asym_Sigma increases. Wafers with poor BQST performance are associated with negative asym_BQST far from zero and large asym_Sigma. This indicates an inconsistent bias state (scissor angle) in the DFL read heads due to the variability in the RHB biasing strength.

Figure 7C:
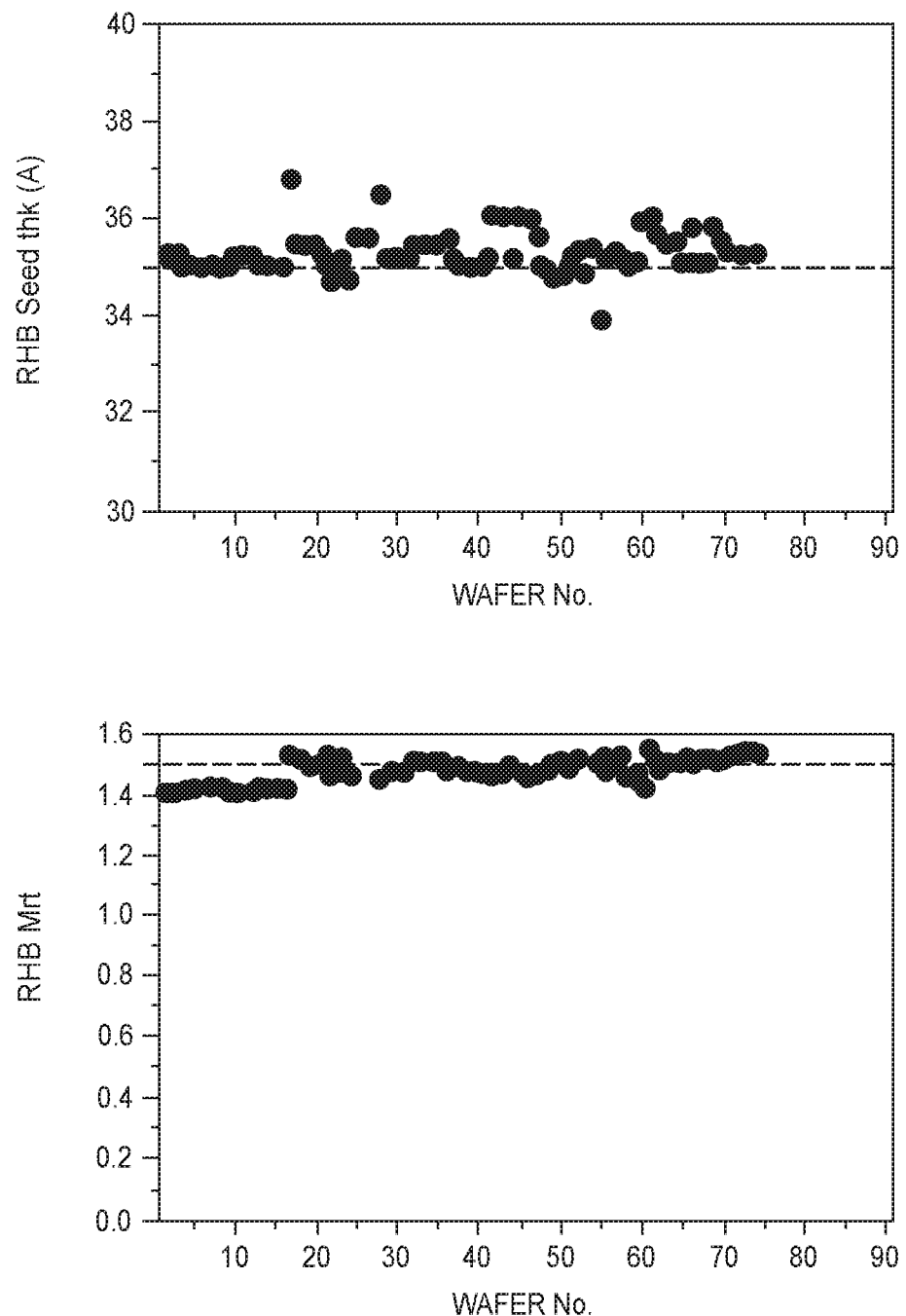
FIG. 7C is a graph illustrating the variations observed from process monitoring charts for the devices illustrated in FIGS. 7A and 7B.

FIG. 7C is a graph illustrating the variations observed from process monitoring charts for the devices illustrated in FIGS. 7A and 7B. The average thickness of the RHB seed layers tested is about 35 Angstroms. The average Mrt of the RHB tested is about 1.5. Because the RHB seed layer thickness and the average Mrt are relatively constant for all wafers tested, it has become clear that the same RHB film can have vastly different properties when applied to the DFL read head with finite geometry. The thickness of the RHB seed layer of about 35 Angstroms may be at the threshold value.

Figure 8:
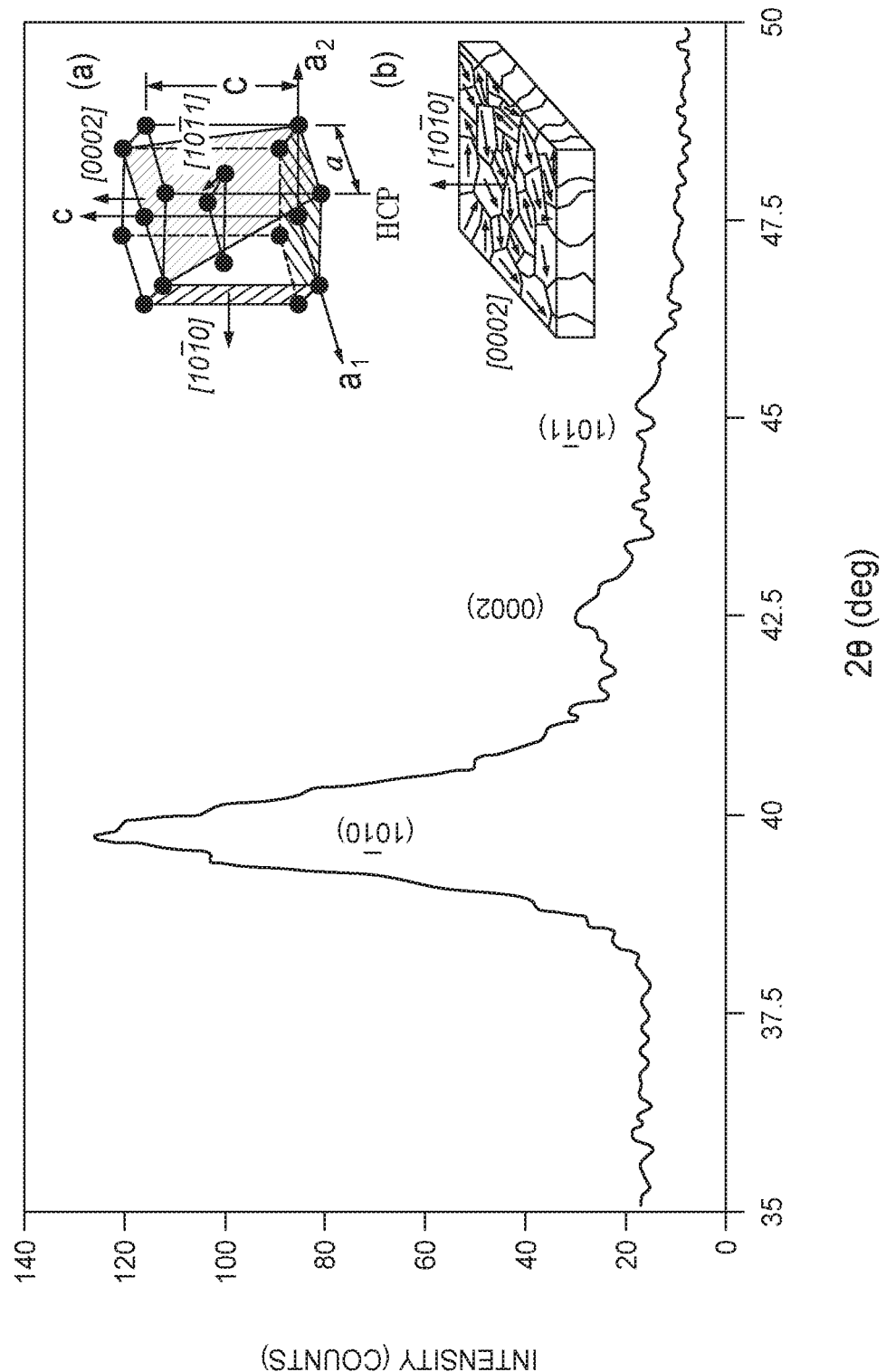
FIG. 8 is a graph illustrating a typical x-ray diffraction pattern of a RHB film according to one embodiment.

FIG. 8 is a graph illustrating a typical x-ray diffraction pattern of a RHB film according to one embodiment. The RHB film may be the RHB stack that includes the RHB and the RHB seed layer. The RHB seed layer may include a first layer of tantalum and a second layer of tungsten, where the second layer of tungsten is disposed between the first layer of tantalum and the RHB.

The (10$\bar{1}$0), (0002), (10$\bar{1}$1) refer to the crystallographic planes in the CoPt crystalline structure. For optimal RHB performance, (10$\bar{1}$0) should be the preferred crystallographic growth plane of Hexagonal Close Packed (HCP) CoPt with predominantly high intensity in x-ray diffraction pattern. The crystallographic plane (0002) in orthogonal direction should contribute a very minimal intensity to the x-ray diffraction pattern, characteristic of the in-plane [0002] crystallographic orientation or the HCP c-axis in favor of RHB magnetization in the plane of the RHB film. Furthermore, graph (a) illustrates the HCP crystalline structure with relative orientations of the relevant crystallographic planes previously mentioned. Graph (b) illustrates the crystallographic orientation of the grains in the RHB film.

Figure 9A:
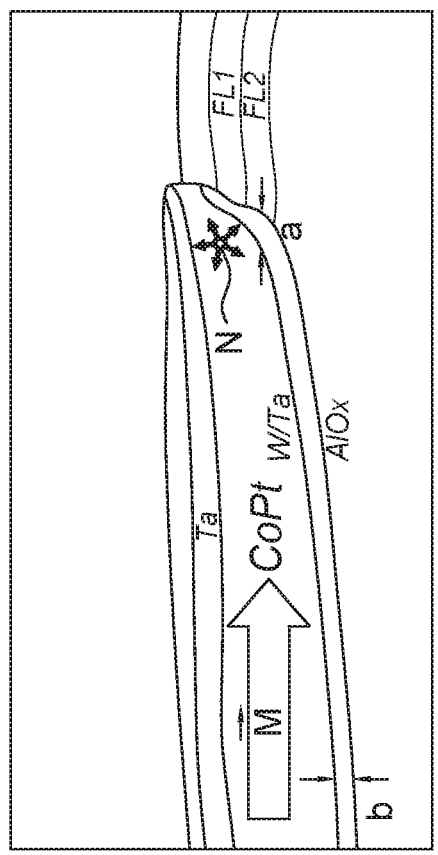
FIGS. 9A and 9B are schematic illustrations of a DFL read head according to another embodiment.
Figure 9B:
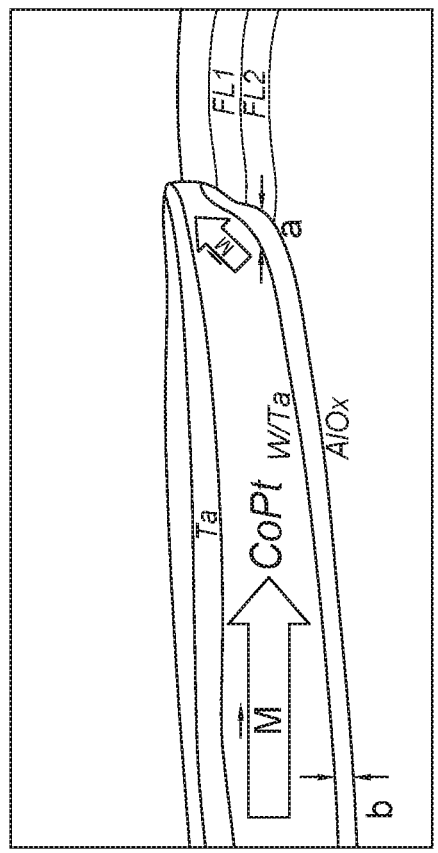

FIGS. 9A and 9B are schematic illustrations of a DFL read head according to another embodiment. Aspects of the DFL read head of FIG. 6 may be similar to the DFL read head of FIGS. 9A and 9B. In FIG. 9A, the RHB seed layer thickness (b) is greater than about 35 Angstroms. In FIG. 9B, the RHB seed layer thickness (b) is less than about 35 Angstroms.

The RHB magnetization direction for the RHB on the RHB seed layer of sufficient thickness tends to orient in the RHB film plane due to the RHB material, such as CoPt, growth texture from the relevant point previously mentioned. During the sputter deposition of the RHB stack over the MTJ junction, the RHB seed layer thickness varies from the target thickness in the area (b) outside the shadow length cast by the photo mask stencil to a reduced thickness near and on the MTJ junction wall (a) due to the non-conformal nature of the sputter depositions. At a target RHB seed layer thickness (b) greater than about 35 Angstroms, the magnetic field generated from (a) by the RHB is deflected upwards instead of into the MTJ stack. The RHB seed layer is thinner but still thick enough at (a) such that the RHB growth texture follows MTJ junction profile, causing local magnetization substantially perpendicular to the MTJ stack. However, at a RHB seed layer thickness (b) less than about 35 Angstroms, the magnetic field generated by the RHB is able to propagate into the MTJ stack rather than being deflected upwards and away from the MTJ stack as signified by the arrow "M". The RHB seed layer is too thin at (a) to sustain the RHB growth texture, causing local magnetization isotropic hence facilitating the propagation of the magnetic field generated from (b) into the MTJ stack signified by the arrows "N".

Figure 10A:
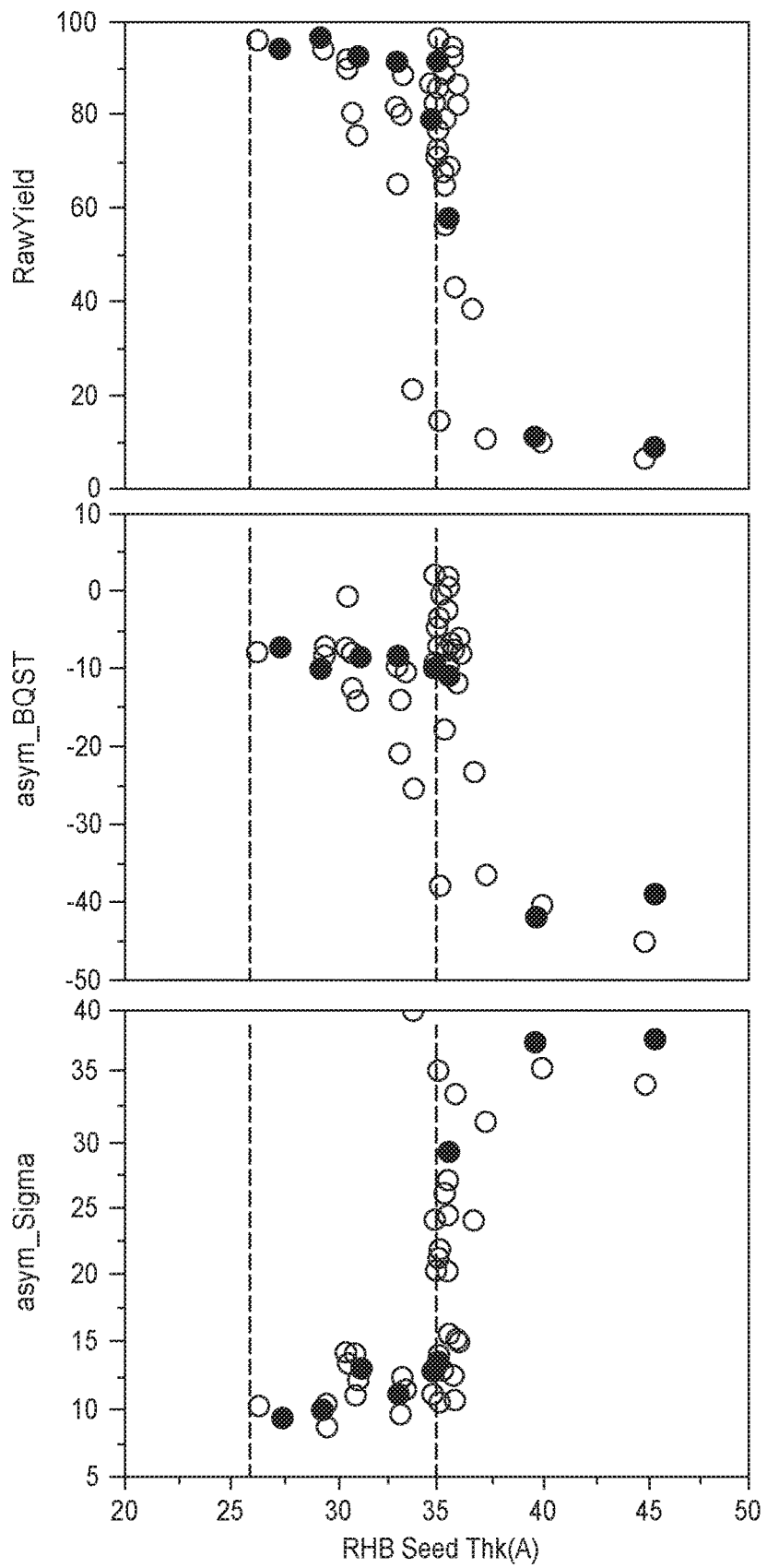
FIG. 10A is a graph illustrating BQST performance as a function of RHB seed layer thickness.

FIG. 10A is a graph illustrating BQST performance as a function of RHB seed layer thickness. The BQST performance as a function of RHB seed layer thickness illustrates a performance regime change at a RHB seed layer thickness of about 35 Angstroms. At a RHB seed layer thickness of about 35 Angstroms, the values of the RawYield of the RHB decrease from about 95% to about 10%. Furthermore, the values for asym_BQST also decrease from about −8% to about −40% at a RHB seed layer thickness of about 35 Angstroms. In addition, the asym_Sigma increases from about 10% to about 35% at a RHB seed layer thickness of about 35 Angstroms. The rapid change of the RawYield, the asym_BQST, and the asym_Sigma values reflect a performance regime change at the RHB seed layer thickness of about 35 Angstroms. For more optimal performance, the RawYield values should be as close to about 100% as possible, the asym_BQST should be as close to 0% as possible, and the asym_Sigma should be as close to 0% as possible. Therefore, for optimal DFL read head performance, the RHB seed layer thickness should be below a critical thickness, related to the coverage of the MTJ junction wall, less than or equal to about 35 Angstroms.

Figure 10B:
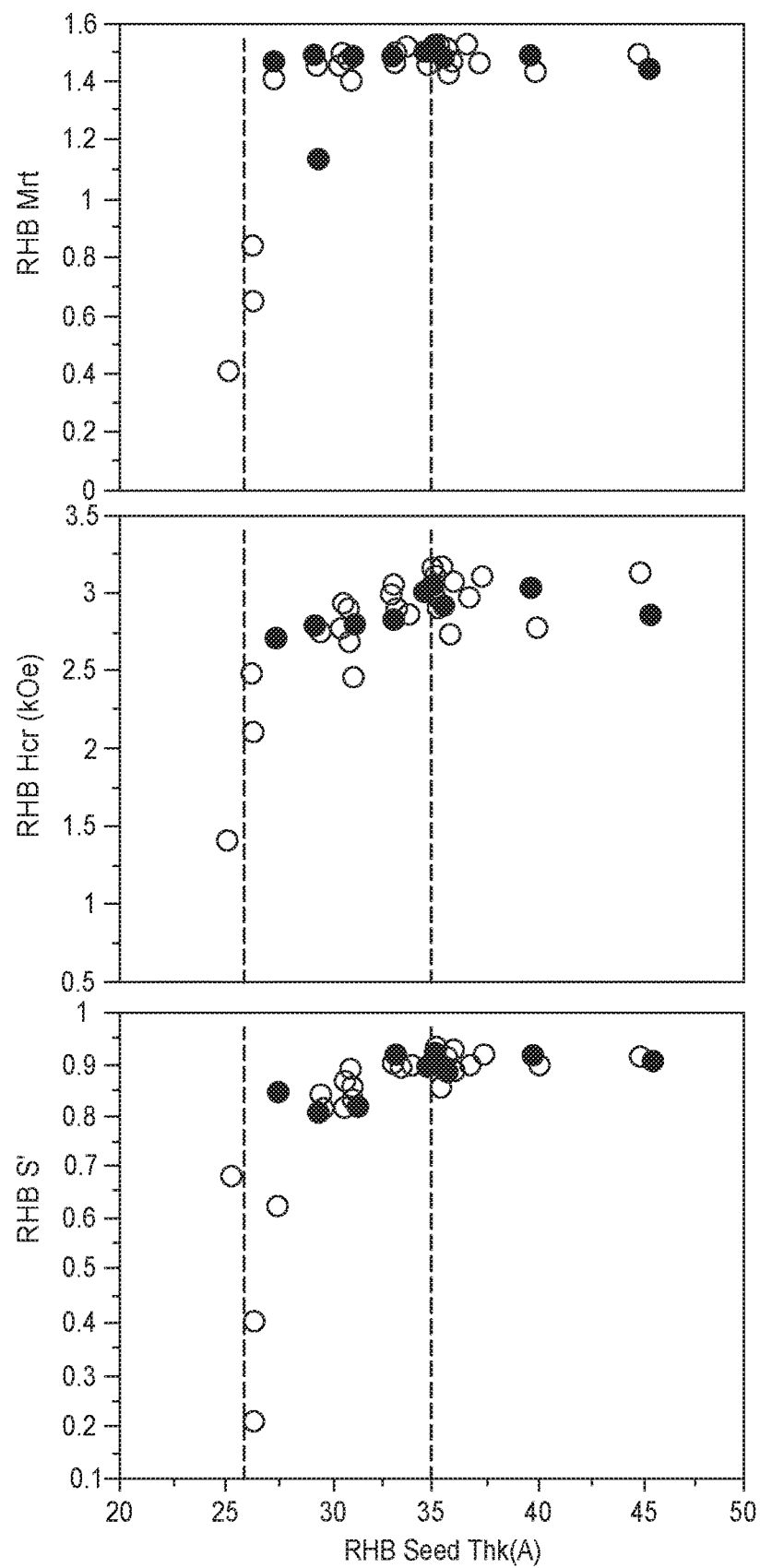
FIG. 10B is a graph illustrating magnetic properties of RHB process monitor films as a function of seed layer thickness.

FIG. 10B is a graph illustrating magnetic properties of RHB process monitor films as a function of seed layer thickness. The magnetic properties of RHB process monitor films as a function of seed layer thickness illustrates a performance regime change at a RHB seed layer thickness of about 26 Angstroms. At a RHB seed layer thickness greater than about 26 Angstroms, the RHB Mrt is constant at about 1.5 memu/cm^2, the RHB Hcr is constant at about 2.75 kOe to about 3 kOe, and the RHB S' is constant at about 0.8 to about 0.9. However, at a RHB seed layer thickness of about 26 Angstroms, the RHB Mrt, RHB Hcr, and the RHB S' values are significantly lower than the RHB Mrt, RHB Hcr, and the RHB S' values for a RHB seed layer thickness greater than about 26 Angstroms. The significant change of the RHB Mrt, RHB Hcr, and the RHB S' values when the RHB seed layer decreases below about 26 Angstroms signifies a magnetic property change of the RHB indicating a potential performance regime change. Therefore, for optimal DFL read head performance, the RHB seed layer thickness should be greater than or equal to about 26 Angstroms.

By using RHB seed layer having a total thickness of between 26 Angstroms and 35 Angstroms, the read head has a strong RHB magnetic field that can be uniformly applied. This is very different from the teachings of the prior art from longitudinal hard bias (HB) stabilization of single free layer (SFL) reader. In those devices, the HB biasing field distribution becomes gradually tighter as the HB seed layer is made thicker. This has been proven not true in the case of RHB for DFL read heads. The RHB is effective hence the performance of DFL read heads is consistent and repeatable only when the RHB seed layer thickness is targeted within certain range, greater than or equal to about 26 Angstroms to less than or equal to about 35 Angstroms.

It is to be understood that the magnetic recording head discussed herein is applicable to a data storage device such as a hard disk drive (HDD) as well as a tape drive, such as a tape embedded drive (TED) or an insertable tape media drive. An example TED is described in co-pending patent application entitled "Tape Embedded Drive", U.S. patent application Ser. No. 16/365,034, filed Mar. 31, 2019 and assigned to the same assignee of the instant application. Any reference in the detailed description to a HDD or tape drive is merely for exemplification purposes and is not intended to limit the disclosure unless explicitly claimed. Furthermore, reference to or claims directed to magnetic recording devices are intended to include both HDD and tape drive unless HDD or tape drive devices are explicitly claimed.

In one embodiment, the TMR sensor is used in a camera operating as a single axis sensor. However, it is contemplated that the TMR sensor may be utilized as a two dimensional or even a three dimensional sensor. Additionally, it is contemplated that TMR sensor may be integrated and utilized in inertial measurement unit technologies other than cameras such as wearable devices, compass, and MEMS devices. Furthermore, the TMR sensor may operate as a position sensor, a bridge angular sensor, a magnetic switch, a current sensor, or combinations thereof. The TMR sensor may be used to focus a camera such as a smart phone camera by using the TMR sensors as position and angular sensors. Also, TMR sensors have applicability in the automotive industry as switch, current, and angular sensors to replace current Hall, AMR and GMR sensors. TMR sensors may also be used in the drones and robotics industry as position and angular sensors. Medical devices can also utilize TMR sensors for flow rate control for infusion systems and endoscope camera sensors among others. Thus, the TMR sensors discussed herein have applications well beyond smart phone cameras and thus should not be limited to use as sensors for smart phone cameras. Furthermore, TMR sensors need not be arranged in a Wheatstone bridge arrangement, but rather, may be arranged in any number of manners.

In one embodiment, a magnetic read head comprises: a first shield; a second shield spaced from the first shield; a sensor disposed between the first shield and the second shield; and a rear hard bias (RHB) structure disposed between the first shield and the second shield, and behind the sensor, wherein the RHB structure comprises: a RHB seed layer, wherein the RHB seed layer has a thickness that is greater than or equal to 26 Angstroms and less than or equal to 35 Angstroms; and a RHB bulk layer. The RHB seed layer has a first portion disposed between the RHB bulk layer and the first shield, and a second portion disposed between the RHB bulk layer and the sensor, wherein the first portion has a first thickness, wherein the second portion has a second thickness different than the first thickness. The first thickness is less than the second thickness. Both the first thickness and the second thickness are each greater than or equal to 26 Angstroms and less than or equal to 35 Angstroms. The RHB seed layer comprises a multilayer structure and wherein the multilayer structure has a collective thickness that is both greater than or equal to 26 Angstroms and less than or equal to 35 Angstroms. The RHB seed layer comprises a nonmagnetic electrically conductive material. A magnetic recording device comprising the magnetic read head is also contemplated.

In another embodiment, a magnetic read head comprises: a dual free layer (DFL) sensor; a read hard bias (RHB) structure, wherein the RHB structure comprises a RHB seed layer having a thickness that is both greater than or equal to 26 Angstroms and less than or equal to 35 Angstroms; and an insulating material disposed between the DFL sensor and the RHB seed layer. The RHB seed layer comprises a first layer of tantalum having a first thickness and a second layer of tungsten having a second thickness. The first layer is disposed between the insulating material and the second layer. The first thickness is between about 10 Angstroms and about 19 Angstroms. The second thickness is between about 16 Angstroms and about 25 Angstroms. The RHB structure comprises CoPt. A magnetic recording device comprising the magnetic read head is also contemplated.

In another embodiment, a magnetic read head comprises: a first shield; a middle shield; a second shield; a first sensor disposed between the first shield and the middle shield; a second sensor disposed between the middle shield and the second shield; a first rear hard bias (RHB) structure disposed between the first shield and the middle shield; and a second RHB structure disposed between the middle shield and the second shield, wherein at least one of the first RHB structure and the second RHB structure includes a first RHB seed layer having a thickness that is both greater than or equal to 26 Angstroms and less than or equal to 35 Angstroms. The first RHB structure includes the first RHB seed layer. The second RHB structure includes a second RHB seed layer having a thickness that is both greater than or equal to 26 Angstroms and less than or equal to 35 Angstroms. The first RHB seed layer comprises a first layer of tantalum having a first thickness and a second layer of tungsten having a second thickness. The second RHB seed layer comprises a first layer of tantalum having a first thickness and a second layer of tungsten having a second thickness. A magnetic recording device comprising the magnetic read head is also contemplated.

While the foregoing is directed to embodiments of the present disclosure, other and further embodiments of the disclosure may be devised without departing from the basic scope thereof, and the scope thereof is determined by the claims that follow.

What is claimed is:

1. A sensing element, comprising:
   a sensor disposed between a first shield and a second shield; and
   a rear hard bias (RHB) structure disposed between the first shield and the second shield, and behind the sensor, wherein the RHB structure comprises:
      a RHB seed layer comprising a multilayer structure, wherein the RHB seed layer has a thickness that is greater than or equal to 26 Angstroms and less than or equal to 35 Angstroms; and
      a RHB bulk layer.

2. The sensing element of claim 1, wherein the RHB seed layer has a first portion disposed between the RHB bulk layer and the first shield, and a second portion disposed between the RHB bulk layer and the sensor, wherein the first portion has a first thickness, wherein the second portion has a second thickness different than the first thickness.

3. The sensing element of claim 2, wherein the first thickness is greater than the second thickness.

4. The sensing element of claim 3, wherein the first thickness is greater than or equal to 26 Angstroms and less than or equal to 35 Angstroms.

5. The sensing element of claim 1, wherein the multilayer structure has a collective thickness that is both greater than or equal to 26 Angstroms and less than or equal to 35 Angstroms.

6. The sensing element of claim 1, wherein the RHB seed layer comprises a nonmagnetic electrically conductive material.

7. A magnetic recording device comprising the sensing element of claim 1.

8. A sensing element, comprising:
   a dual free layer (DFL) sensor;
   a read hard bias (RHB) structure, wherein the RHB structure comprises a RHB seed layer having a thickness that is both greater than or equal to 26 Angstroms and less than or equal to 35 Angstroms, wherein the RHB seed layer comprises a first layer of tantalum having a first thickness and a second layer of tungsten having a second thickness; and
   an insulating material disposed between the DFL sensor and the RHB seed layer.

9. The sensing element of claim 8, wherein the RHB structure comprises CoPt.

10. A magnetic recording device comprising the sensing element of claim 8.

11. A sensing element, comprising:
    a dual free layer (DFL) sensor;
    a read hard bias (RHB) structure, wherein the RHB structure comprises a RHB seed layer having a thickness that is both greater than or equal to 26 Angstroms and less than or equal to 35 Angstroms, and wherein the RHB seed layer comprises a first layer of tantalum having a first thickness and a second layer of tungsten having a second thickness; and
    an insulating material disposed between the DFL sensor and the RHB seed layer, wherein the first layer is disposed between the insulating material and the second layer.

12. The sensing element of claim 11, wherein the first thickness is between about 10 Angstroms and about 19 Angstroms.

13. The sensing element of claim 11, wherein the second thickness is between about 16 Angstroms and about 25 Angstroms.

14. A sensing element, comprising:
    a first sensor disposed between a first shield and a middle shield;
    a second sensor disposed between the middle shield and a second shield;
    a first rear hard bias (RHB) structure disposed between the first shield and the middle shield; and
    a second RHB structure disposed between the middle shield and the second shield, wherein at least one of the first RHB structure and the second RHB structure includes a first RHB seed layer comprising tantalum having a thickness that is both greater than or equal to 26 Angstroms and less than or equal to 35 Angstroms.

15. The sensing element of claim 14, wherein the first RHB structure includes the first RHB seed layer.

16. The sensing element of claim 15, wherein the second RHB structure includes a second RHB seed layer having a thickness that is both greater than or equal to 26 Angstroms and less than or equal to 35 Angstroms.

17. A magnetic recording device comprising the sensing element of claim 14.

18. A sensing element, comprising:
    a first sensor disposed between a first shield and a middle shield;
    a second sensor disposed between the middle shield and a second shield;
    a first rear hard bias (RHB) structure disposed between the first shield and the middle shield; and
    a second RHB structure disposed between the middle shield and the second shield, wherein at least one of the first RHB structure and the second RHB structure includes a first RHB seed layer having a thickness that is both greater than or equal to 26 Angstroms and less than or equal to 35 Angstroms,
    wherein the first RHB structure includes the first RHB seed layer, wherein the second RHB structure includes a second RHB seed layer having a thickness that is both greater than or equal to 26 Angstroms and less than or equal to 35 Angstroms, wherein the first RHB seed layer comprises tantalum, and wherein the second RHB seed layer comprises tungsten.

* * * * *